(12) United States Patent
Ma

(10) Patent No.: US 11,863,727 B2
(45) Date of Patent: Jan. 2, 2024

(54) IMAGE CALIBRATION METHOD, IMAGE FORMATION DEVICE, AND STORAGE MEDIUM

(71) Applicant: ZHUHAI PANTUM ELECTRONICS CO., LTD., Guangdong (CN)

(72) Inventor: Yangxiao Ma, Guangdong (CN)

(73) Assignee: ZHUHAI PANTUM ELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 17/834,400

(22) Filed: Jun. 7, 2022

(65) Prior Publication Data

US 2023/0037425 A1  Feb. 9, 2023

(30) Foreign Application Priority Data

Aug. 2, 2021 (CN) .......................... 202110888833.6

(51) Int. Cl.
*H04N 1/60* (2006.01)
*H04N 1/52* (2006.01)

(52) U.S. Cl.
CPC ............. *H04N 1/6041* (2013.01); *H04N 1/52* (2013.01); *H04N 1/6016* (2013.01)

(58) Field of Classification Search
CPC ..... H04N 1/6041; H04N 1/60; G03G 15/5058
See application file for complete search history.

(56) References Cited

U.S. PATENT DOCUMENTS

| | | | | |
|---|---|---|---|---|
| 6,963,424 B1 * | 11/2005 | Higuchi | ............. | H04N 1/00973 358/1.9 |
| 9,204,012 B2 * | 12/2015 | Furukawa | ............ | H04N 1/6033 |
| 9,575,429 B2 * | 2/2017 | Iguchi | ................ | G03G 15/0178 |
| 10,194,053 B2 * | 1/2019 | Otani | ................... | H04N 1/4072 |
| 10,872,278 B1 * | 12/2020 | Kuo | ....................... | G06K 15/027 |
| 2004/0227966 A1 * | 11/2004 | Lee | ..................... | H04N 1/00031 358/1.9 |
| 2007/0081205 A1 | 4/2007 | Tai et al. | | |

(Continued)

FOREIGN PATENT DOCUMENTS

| | | | | |
|---|---|---|---|---|
| EP | 2874007 A1 * | 5/2015 | ......... | G03G 15/5058 |
| EP | 2874007 A1 | 5/2015 | | |
| JP | 2016208151 A * | 12/2016 | | |

OTHER PUBLICATIONS

Extended European Search Report issued in EP 22176347.7 dated Nov. 15, 2022.

*Primary Examiner* — Ted W Barnes

(74) *Attorney, Agent, or Firm* — Leydig, Voit & Mayer, Ltd.

(57) ABSTRACT

Provided is an image calibration method, an image formation device and a storage medium. The image calibration method includes: acquiring at least one of a first end color density value or a second end color density value of a calibration reference image along a direction to be calibrated; calculating a difference between the at least one of the first end color density value or the second end color density value and a target color density value, to obtain at least one of a first end color density difference value or a second end color density difference value; and performing uniformity calibration on an image to be calibrated if the at least one of the first end color density difference value or the second end color density difference value is greater than or equal to a preset difference threshold.

10 Claims, 9 Drawing Sheets

(56) References Cited

U.S. PATENT DOCUMENTS

| | | | |
|---|---|---|---|
| 2007/0139733 A1* | 6/2007 | Mizes | H04N 1/6033 358/504 |
| 2009/0087207 A1* | 4/2009 | Iida | G03G 15/043 399/74 |
| 2011/0164293 A1* | 7/2011 | Eom | G03G 15/5058 358/504 |
| 2011/0194862 A1* | 8/2011 | Shindo | G03G 15/5041 399/27 |
| 2011/0222869 A1* | 9/2011 | Sakatani | H04N 1/4078 399/15 |
| 2011/0285763 A1* | 11/2011 | Bassi | G09G 3/2003 345/694 |
| 2014/0152706 A1* | 6/2014 | Park | G09G 3/2003 345/690 |
| 2015/0139673 A1* | 5/2015 | Devlieghere | H04N 1/6041 399/49 |
| 2016/0139529 A1* | 5/2016 | Iguchi | G03G 15/5062 399/39 |
| 2017/0111547 A1* | 4/2017 | Otani | H04N 1/4072 |
| 2018/0288236 A1* | 10/2018 | Tomii | H04N 1/00082 |
| 2019/0387131 A1* | 12/2019 | Komatsu | H04N 1/6094 |
| 2021/0041822 A1* | 2/2021 | Yokote | G03G 15/55 |
| 2022/0284247 A1* | 9/2022 | Stanich | H04N 1/4015 |
| 2022/0286578 A1* | 9/2022 | Stanich | H04N 1/405 |
| 2022/0286581 A1* | 9/2022 | Kailey | B41J 2/2146 |

* cited by examiner

IMAGE CALIBRATION METHOD, IMAGE FORMATION DEVICE, AND STORAGE MEDIUM

CROSS-REFERENCE TO RELATED APPLICATIONS

The present application claims priority to Chinese Patent Application No. 202110888833.6, filed on Aug. 2, 2021, the content of which is incorporated herein by reference in its entirety.

TECHNICAL FIELD

The present disclosure relates to the technical field of image formation, in particular to an image calibration method, an image formation device and a storage medium.

BACKGROUND

An image formation device is a device that forms an image on a recording medium based on an imaging principle, such as a printer, a copier, a facsimile machine, a multifunctional image making and copying apparatus, an electrostatic printing apparatus, and any other similar apparatus.

A photosensitive module is one of the most important components in a developing and imaging process of the image formation device. Common photosensitive components include a photosensitive drum, a surface of which is coated with a photosensitive material. When a laser scanning unit (LSU) irradiates a surface of the photosensitive drum, an area irradiated by the LSU has a decreased resistance and electric charges at this area disappear; however, electric charges at another area not irradiated by the LSU are remained. Finally, the surface of the photosensitive drum forms an electrostatic latent image that consists of electric charges. When the photosensitive drum surface having charges passes a developing module, a developing roller sends, by cooperating with an action of a force such as an electric field force, the developer such as toner for forming a visible image to the electrostatic latent image on the photosensitive drum surface, such that the above-mentioned electrostatic latent image is visualized.

However, when the image formation device is used for long time, non-uniformity of an image may be caused due to aging of the photosensitive drum and the like. For example, an image at a left/right side has a light color, while an image at a center has a dark color. That is, a problem of poor uniformity of the images in a horizontal direction is caused. Moreover, there may also be a problem of poor uniformity in other directions, such as a vertical direction.

SUMMARY

The embodiments of the present disclosure provide an image calibration method, an image formation device and a storage medium, so as to help solve the problem of poor imaging uniformity in the prior art. Of course, there may also be problems of poor uniformity in other directions, such as the vertical direction.

In a first aspect, an embodiment of the present disclosure provides an image calibration method, including:

acquiring at least one of a first end color density value or a second end color density value of a calibration reference image along a direction to be calibrated;

calculating a difference between the at least one of the first end color density value or the second end color density value and a target color density value, to obtain at least one of a first end color density difference value or a second end color density difference value; and performing uniformity calibration on an image to be calibrated if the at least one of the first end color density difference value or the second end color density difference value is greater than or equal to a preset difference threshold.

In an embodiment, said performing uniformity calibration on an image to be calibrated includes:

calculating, by interpolation fitting, a compensation color density value of an image to be calibrated by taking a reference axis of the image to be calibrated as a standard position, the reference axis being perpendicular to the direction to be calibrated; and blending an original bitmap image of the image to be calibrated with a compensation bitmap image corresponding to the compensation color density value to obtain a calibrated image.

In an embodiment, prior to blending an original bitmap image of the image to be calibrated with a compensation bitmap image corresponding to the compensation color density value to obtain a calibrated image, the image calibration method further includes:

converting the compensation color density value into a corresponding pixel gray value;

converting the pixel gray value into corresponding raster lattice data; and determining, based on a black point distribution characteristic of the raster lattice data, whether or not to perform uniformity calibration on the image to be calibrated.

In an embodiment, said converting the compensation color density value into a corresponding pixel gray value includes:

mapping, based on a mapping table, the compensation color density value to a corresponding pixel gray value.

In an embodiment, said converting the pixel gray value into corresponding raster lattice data includes:

converting, based on a halftone matrix table, the pixel gray value into corresponding raster lattice data.

In an embodiment, said converting, based on a halftone, the matrix table the pixel gray value into corresponding raster lattice data includes:

converting, based on a halftone matrix table of each color channel and by means of a same binary rasterization manner, the pixel gray value into corresponding raster lattice data.

In an embodiment, the target color density value is a preset color density value matching the calibration reference image; or the target color density value is an average value of the first end color density value and the second end color density value.

In an embodiment, the calibration reference image includes a first color block group and a second color block group, and the first color block group is symmetrical to the second color block group with respect to a reference axis of the calibration reference image. A color block in the first color block group and another block in the second color block group that is symmetrical to the color block in the first color block group have a same pixel value. The reference axis is perpendicular to the direction to be calibrated.

In an embodiment, each of the first color block group and the second color block group include two or more color blocks, and the two or more color blocks have different pixel values.

In an embodiment, prior to acquiring at least one of a first end color density value or a second end color density value of a calibration reference image along a direction to be calibrated, the image calibration method further includes:

printing a calibration reference image.

In an embodiment, the direction to be calibrated is at least one of a horizontal direction or a vertical direction of a printing page.

In a second aspect, an embodiment of the present disclosure provides an image formation device including: a processor; and a memory. A computer program is stored in the memory, and when the computer program is executed, the image formation device is caused to execute the image calibration method described in the first aspect.

In a third aspect, an embodiment of the present disclosure provides a computer-readable storage medium which stores a program. When the program is run, a device where the computer-readable storage medium is arranged is controlled to perform the image calibration method described in the first aspect.

According to the solution provided by the embodiments of the present disclosure, uniformity calibration can be performed on the image formation device with poor uniformity, such that the image printed by the image formation device has good uniformity. In addition, the calibration scheme provided by the embodiments of the present disclosure can avoid an influence on the printing efficiency due to multiple measurements or calibrations, thereby saving measurement time and cost.

BRIEF DESCRIPTION OF DRAWINGS

In order to better illustrate the technical solutions of the embodiments of the present disclosure, accompanying drawings used in the embodiments are briefly described in the following description. It should be noted that, the accompanying drawings in the following description merely illustrate some, rather than all, of the embodiments of the present disclosure. For those skilled in the art, other drawings can be obtained from these drawings without any creative effort.

DESCRIPTION OF EMBODIMENTS

In order to better illustrate the technical solutions of the present disclosure, the embodiments of the present disclosure are described in detail below with reference to the accompanying drawings.

It should be noted that the described embodiments are merely some, rather than all, of the embodiments of the present disclosure. Based on these embodiments in the present disclosure, all other embodiments obtained by those skilled in the art without any creative effort fall within a protection scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association describing associated objects, indicating that there may be three relationships, for example, "A and/or B" indicates three cases, i.e., only A existing, both A and B existing, and only B existing. In addition, the characteristic "/" herein generally indicates that the associated objects form an "or" relationship therebetween.

Figure 1:
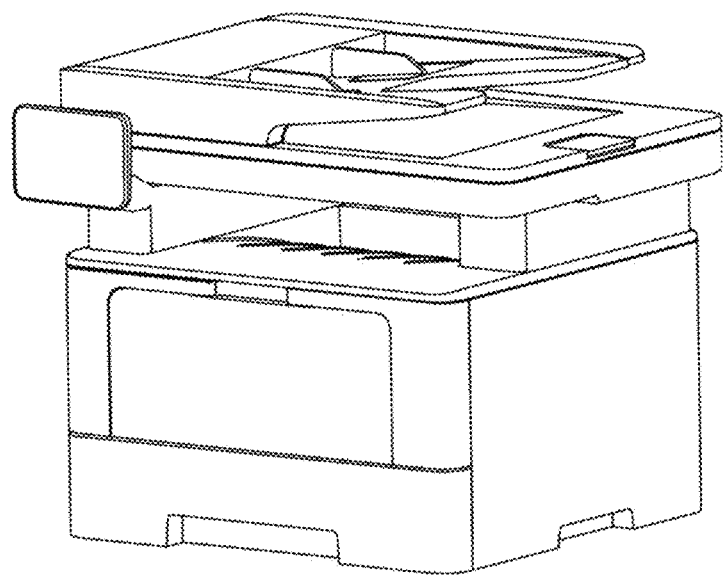
FIG. 1 is a schematic diagram of an application scenario provided by an embodiment of the present disclosure.

Referring to FIG. 1, a schematic diagram of an application scenario is provided by an embodiment of the present disclosure. An image formation device 100 is shown in FIG. 1. An image calibration method provided by an embodiment of the present disclosure can be applied to the image formation device 100. It can be understood that FIG. 1 is merely an exemplary schematic diagram, and the embodiments of the present disclosure do not limit a specific configuration of the image formation device 100. For example, the image formation device 100 includes, but is not limited to, a printer, a copier, a fax machine, a scanner, and a multifunctional peripheral device that performs the above-mentioned functions in a single device.

In an actual application process, after the image formation device is used for long time, a problem of non-uniformity of an image may be caused due to aging of the photosensitive drum and the like.

Figure 2A:
FIG. 2A is a schematic diagram of an image to be calibrated provided by an embodiment of the present disclosure.

FIG. 2A is a schematic diagram of an image to be calibrated provided by an embodiment of the present disclosure. As shown in FIG. 2A, an image at a left/right side of the image to be calibrated has a light color, while an image at a center has a dark color.

Figure 2B:
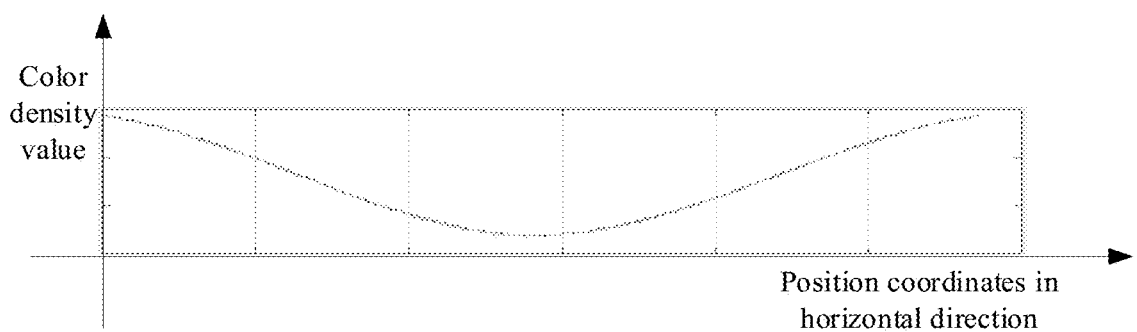
FIG. 2B is a schematic diagram of a color density curve provided by an embodiment of the present disclosure.

Referring to FIG. 2B, a schematic diagram of a color density curve is provided by an embodiment of the present disclosure. The color density curve shown in FIG. 2B is the color density curve of the image shown in FIG. 2A, and is configured to present a color density change of the image in a horizontal direction. It can be seen from the color density curve that, the image has a relatively high color density value at each of the left side and the right side of the image, and has a relatively low color density value at a center of the image.

Therefore, it can be seen from FIG. 2A and FIG. 2B that the image to be calibrated has poor uniformity in the horizontal direction.

It can be understood that in addition to the horizontal direction, there may also be a problem of poor uniformity in other directions, such as a vertical direction.

Based on this, an embodiment of the present disclosure provides an image calibration method, an image formation device and a storage medium, aiming to solve the problem of poor uniformity of the image in the prior art. The embodiments of the present disclosure will be described in the following inn detail in combination with the accompanying drawings.

Figure 3:
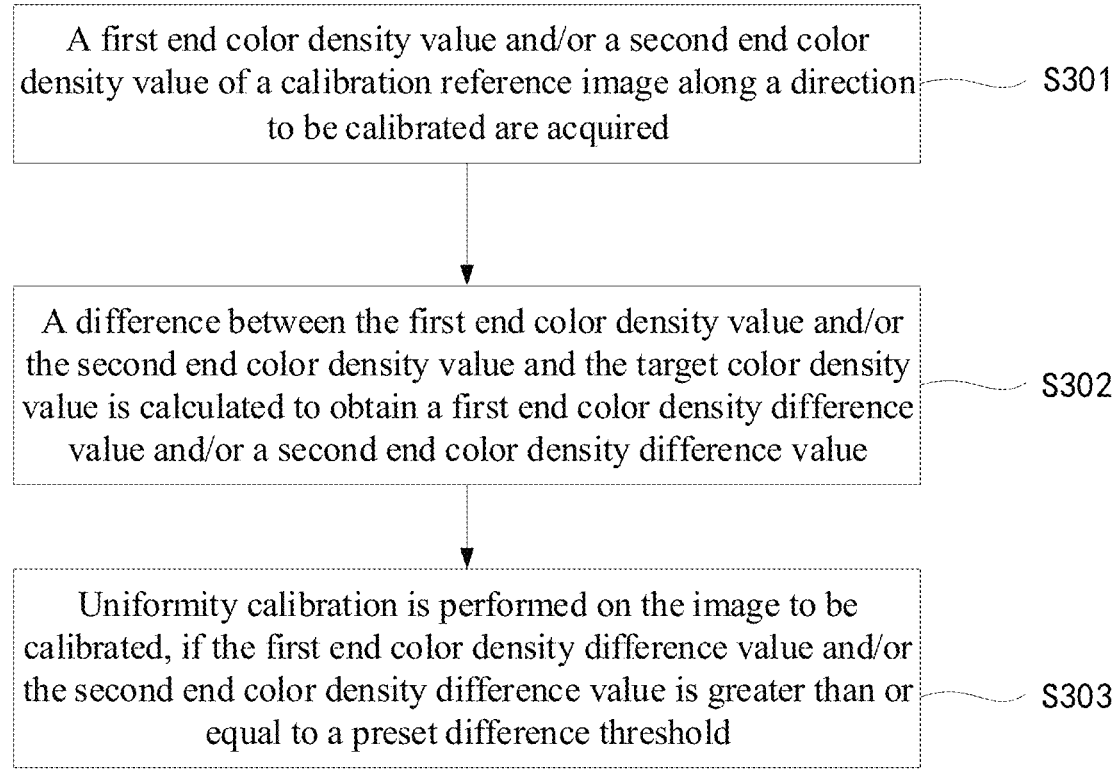
FIG. 3 is a schematic diagram of an image calibration method provided by an embodiment of the present disclosure.

FIG. 3 is a schematic diagram of an image calibration method provided by an embodiment of the present disclosure. The image calibration method can be applied to the image formation device shown in FIG. 1. As shown in FIG. 3, the method mainly includes the following steps.

At step S301, a first end color density value and/or a second end color density value of a calibration reference image along a direction to be calibrated are acquired.

The direction to be calibrated described in the embodiments of the present disclosure refers to a direction of a printing page in which uniformity calibration needs to be performed. For example, the direction to be calibrated may be a horizontal direction or a vertical direction of the printing page, and of course, may also be another direction of the printing page, which will not be specifically limited in the embodiments of the present disclosure.

In an implementation manner, the calibration reference image can be printed by an image formation device to be calibrated, such that the image formation device to be calibrated can be calibrated based on the calibration reference image.

In some possible implementation manners, the calibration reference image may be a halftone image. The halftone refers to a picture tone whose tone value is expressed by a size of each of dots or a density of dots. A counterpart corresponding to halftone is continuous tone. A continuous tone image usually refers to an image whose color tone changing from light to dark or from weak to strong is formed by a particle density of an imaging material per unit area. The darkness or the strength of a continuous tone image changes infinitely, such as photo negatives, photos, various drawings. A halftone image usually refers to an image whose color tome changing from light to dark or from weak to strong on a printed material after special processing is expressed by a size of each of dots. Since each of the dots is separated from one another by a certain distance and the dots are distributed discretely, and there is always a certain restriction on the number of the gray levels of screen, a halftone image cannot achieve infinite changing in terms of darkness/strength as the continuous tone image does, and that's why it is called a halftone image.

The color density can indicate a darkness/strength/depth of the image. If the difference between the color density values at both ends of the direction to be calibrated and the target color density value is large, it indicates that uniformity of the direction to be calibrated is poor, and uniformity calibration needs to be performed on the image formation device in the direction to be calibrated. On the contrary, if the difference between the color density values at both ends of the direction to be calibrated and the target color density value is small, it indicates that uniformity of the direction to be calibrated is good, and uniformity calibration does not need to be performed on the image formation device in the direction to be calibrated. Therefore, according to the embodiments of the present disclosure, the color density values at both ends of the direction to be calibrated in the calibration reference image needs to be acquired. For convenience of explanation, in the embodiments of the present disclosure, the color density values at both ends of the direction to be calibrated are respectively referred to as a first end color density value and a second end color density value.

It should be noted that in some possible implementation manners, each of the first end color density value and the second end color density value may include a set of data. For example, N first end color density values and N second end color density values are provided where N≥2.

For example, when the direction to be calibrated is the horizontal direction, the first end color density value and the second end color density value are a left end color density value and a right end color density value of the calibration reference image, respectively. In an implementation manner, each of the left end color density value and the right end color density value may include a set of data. That is, N left end color density values and N right end color density values are provided. An $i^{th}$ left end color density value is denoted as Density_Left[i], and an $i^{th}$ right end color density value is denoted as Density_Right[i].

In some possible implementation manners, the calibration reference image includes a first color block group and a second color block group, and the first color block group is symmetrical to the second color block group with respect to a reference axis of the calibration reference image. A color block in the first color block group and another block in the second color block group that is symmetrical to the color block in the first color block group have a same pixel value. The reference axis is perpendicular to the direction to be calibrated.

As shown above, each of the first end color density value and the second end color density value may include a set of data. That is, N first end color density values and N second end color density values may be provided, where N≥2. Correspondingly, each of the first color block group and the second color block group includes N color blocks, so as to obtain N first end color density values according to the N color blocks in the first color block group and obtain N second end color density values according to N color blocks in the second color block group. In some possible implementation manners, the N color blocks have different pixel values. For example, the pixel values of the N color blocks vary evenly from 0 to 255. Of course, one skilled in the art may also define the pixel values of the N color blocks in other ways, which are not specifically limited in the embodiments of the present disclosure.

Figure 4:
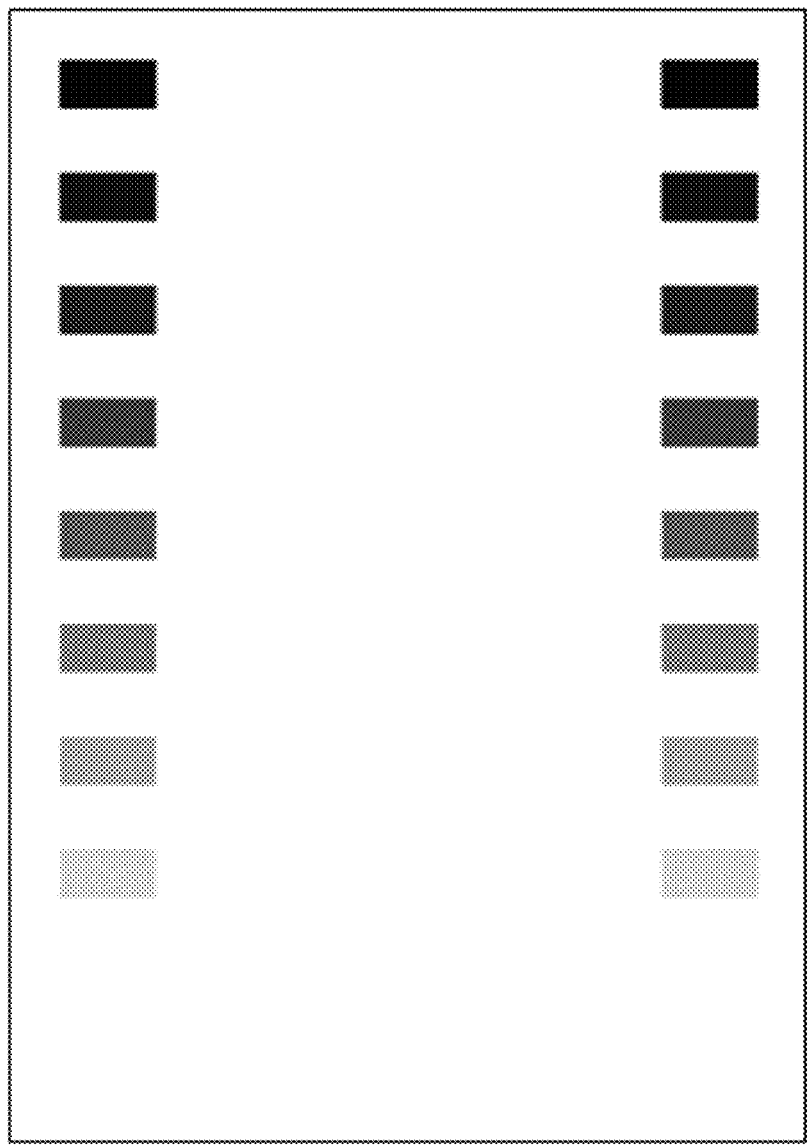
FIG. 4 is a schematic diagram of a calibration reference image provided by an embodiment of the present disclosure.

FIG. 4 is a schematic diagram of a calibration reference image is provided by an embodiment of the present disclosure. As shown in FIG. 4, the calibration direction corresponding to the calibration reference image is the horizontal direction. The calibration reference image includes two color block groups, namely a first color block group and a second color block group, and the first color block group is symmetrical to the second color block group.

In some embodiments, each of the first color block group and the second color block group includes nine color blocks. RGB values of the nine color blocks are respectively are, from top to bottom, (0, 0, 0) (32, 32, 32) (64, 64, 64) (96, 96, 96) (128, 128, 128) (160, 160, 160) (192, 192, 192) (224, 224, 224) (255, 255, 255).

In the embodiments of the present disclosure, the first color block group being symmetrical to the second color block group refers to that positions of the color blocks in the first color block group are symmetrical to positions of the color blocks in the second color block group, and the RGB value of a color block in the first color block group is the same as a the RGB value of another color block in the second color block group that is symmetrical to the color block in the first color block group. For example, in the calibration reference image shown in FIG. 4, the RGB value of a left color block in a first row is (0, 0, 0) and the RGB value of a right color block in the first row is (0, 0, 0), and the RGB value of a left color block in a second row is (32, 32, 32) and the RGB value of a right color block in the second row is (32, 32, 32), etc., which will not be repeated herein in the embodiments of the present disclosure.

In some embodiments, the left end color density value and the right end color density value acquired according to the calibration reference image shown in FIG. 4 are shown in Table 1.

TABLE 1

| | Sequence number of the row of the color block | | | | | | | |
|---|---|---|---|---|---|---|---|---|
| | 2 | 3 | 4 | 5 | 6 | 7 | 8 | 9 |
| Left end color density value | 1.08 | 0.84 | 0.71 | 0.54 | 0.37 | 0.25 | 0.11 | 0.04 | 0 |
| Right end color density value | 1.11 | 0.96 | 0.82 | 0.68 | 0.54 | 0.41 | 0.27 | 0.13 | 0.01 |

The left end color density value corresponding to the color block in the first row is 1.08, and the right end color density value corresponding to the color block in the first row is 1.11. The left end color density value corresponding to the color block in the second row is 0.84, and the right end color density value corresponding to the color block in the second row is 0.96, etc., which will not be further described herein.

It should be noted that the calibration reference image shown in FIG. 4 merely illustrates a possible implementation manner, and should not be regarded as a limitation to a scope of the present disclosure. For example, one skilled in the art can arrange more than two color blocks (such as three or four color blocks) in each row according to actual requirements. Only the color density values of the color blocks at the left and the right ends are taken when determining whether calibration is required. Of course, whether calibration is required may also be determined by the color density values of the two or more color blocks, which will not be specifically limited in the embodiments of the present disclosure.

At step S302, a difference between the first end color density value and/or the second end color density value and the target color density value is calculated to obtain a first end color density difference value and/or a second end color density difference value.

In a possible implementation manner, the target color density value may be a preset color density value that matches the calibration reference image. Alternatively, the target color density value may be an average value of the first end color density value and the second end color density value. In an implementation manner, an image formation device with normal calibration and normal uniformity can be used to acquire the color density value of each color block in the calibration reference image, and obtain the color density value of each color block. The target color density value is obtained by calculating the average value of the first end color density value and the second end color density value, which will not be limited herein in the embodiments of the present disclosure.

As described above, each of the first end color density value and the second end color density value may include a set of data. That is, N first end color density values and N second end color density values may be provided, where N≥2. Correspondingly, the target color density value also includes a set of data. That is, N target color density values are provided.

Referring to Table 2, a target color density value corresponding to the calibration reference image shown in FIG. 4 is provided by an embodiment of the present disclosure. As shown in Table 2, the target color density value includes nine data, corresponding to each row of color blocks in FIG. 4, that is, each row of color blocks corresponds to a target color density value. For example, the target color density value corresponding to the color block in the first row is 1.12, the target color density value corresponding to the color block in the second row is 0.98, etc.

TABLE 2

| | Sequence number of the row of the color block | | | | | | | | |
|---|---|---|---|---|---|---|---|---|---|
| | 1 | 2 | 3 | 4 | 5 | 6 | 7 | 8 | 9 |
| Target color density value | 1.12 | 0.98 | 0.84 | 0.7 | 0.56 | 0.42 | 0.28 | 0.14 | 0 |

For convenience of explanation, an $i^{th}$ target color density value is denoted as Density_Center[i], a difference between each of the N first end color density values and/or each of the N second end color density values and each of the N target color density values is calculated to obtain N first end color density difference values and/or N second end color density difference values, where N≥2.

If the direction to be calibrated is the horizontal direction, a difference between the left end color density value and/or the right end color density value and the target color density value is calculated to obtain the left end color density difference value and/or the right end color density difference value. Calculation formulas are as follows.

DeltaDensity_CL[i]=Density_Center[i]−Density_Left[i]　　Formula I

DeltaDensity_CR[i]=Density_Center[i]−Density_Right[i]　　Formula II

In the formulas, DeltaDensity_CL[i] represents an $i^{th}$ left end color density difference value and DeltaDensity_CR[i] represents an $i^{th}$ right end color density difference value.

In a possible implementation manner, a difference between each of the left end color density values and the right end color density values shown in Table 1 and each of the target color density values shown in Table 2 are respectively calculated to obtain the left end color density difference values and the right end color density difference values, which are as shown in Table 3.

TABLE 3

| | Sequence number of the row of the color block | | | | | | | | |
|---|---|---|---|---|---|---|---|---|---|
| | 1 | 2 | 3 | 4 | 5 | 6 | 7 | 8 | 9 |
| Left end color density difference value | 0.04 | 0.14 | 0.13 | 0.16 | 0.19 | 0.17 | 0.17 | 0.1 | 0 |
| Right end color density difference value | 0.01 | 0.02 | 0.02 | 0.02 | 0.02 | 0.01 | 0.01 | 0.01 | −0.01 |

The left end color density difference value corresponding to the color block in the first row is 0.04 and the right end color density difference value corresponding to the color block in the first row is 0.01, the left end color density difference value corresponding to the color block in the second row is 0.14 and the right end color density difference value corresponding to the color block in the second row is 0.02, etc., which will not be repeated herein.

At step S303, uniformity calibration is performed on the image to be calibrated, if the first end color density difference value and/or the second end color density difference value is greater than or equal to a preset difference threshold.

The image to be calibrated in the embodiments of the present disclosure can be illustrated as an image printed by the image formation device to be calibrated.

In an implementation manner, a difference threshold is defined in an embodiment of the present disclosure, such that the first end color density difference value and/or the second end color density difference value obtained in step S302 can be compared with the difference threshold, respectively, to determine whether uniformity calibration is required. If the difference between the first end color density difference value and/or the second end color density difference is greater than or equal to the preset difference threshold, it indicates that the uniformity of the calibration reference image is poor, that is, the uniformity of the corresponding image formation device is relatively poor, and uniformity calibration needs to be performed on the image formation device. On the contrary, if the first end color density difference value and/or the second end color density difference value is smaller than the preset difference threshold, it indicates that the uniformity of the calibration reference image is good, that is, the uniformity of the corresponding image formation device is good, and uniformity calibration does not need to be performed on the image formation device In a possible implementation manner, if the first end color density difference value or the second end color density difference value is greater than or equal to a preset difference threshold, uniformity calibration is performed on the image to be calibrated. That is, as long as the color density difference value at one end is greater than or equal to the preset difference threshold, the uniformity calibration is performed.

One skilled in the art can define the difference threshold corresponding to the value according to actual requirements, which will not be limited in the embodiments of the present disclosure.

In some possible implementation manners, performing uniformity calibration on the image to be calibrated includes: calculating, by interpolation fitting, a compensation color density value of the image to be calibrated by taking the reference axis of the image to be calibrated as a standard position, where the reference axis is perpendicular to the image to be calibrated direction. In some embodiments, the reference axis can be a perpendicular bisector of a width of the page, and the width of the page can be illustrated as a width of the page in the direction to be calibrated. An original bitmap image of the image to be calibrated is blended with a compensation bitmap images corresponding to the compensation color density value to obtain a calibrated image.

Referring to Table 4, compensation color density values within the width of the page calculated by interpolation fitting is provided by an embodiment of the present disclosure, which corresponds to the embodiment shown in FIG. 4, and the width of the page corresponds to the horizontal direction.

TABLE 4

| LeftN | Left ... | Left 3 | Left 2 | Left 1 | Left 0 | Center | Right 0 | Right 1 | Right 2 | Right 3 | Right ... | RightN |
|---|---|---|---|---|---|---|---|---|---|---|---|---|
| BN | B ... | B3 | B2 | B1 | B0 | Target | A0 | A1 | A2 | A3 | A ... | AN |

In Table 4, AN represents a compensation color density value corresponding to Density_Right, BN represents a compensation color density value corresponding to Density_Left, and Target represents a compensation color density value corresponding to Density_Center.

Figure 5A:
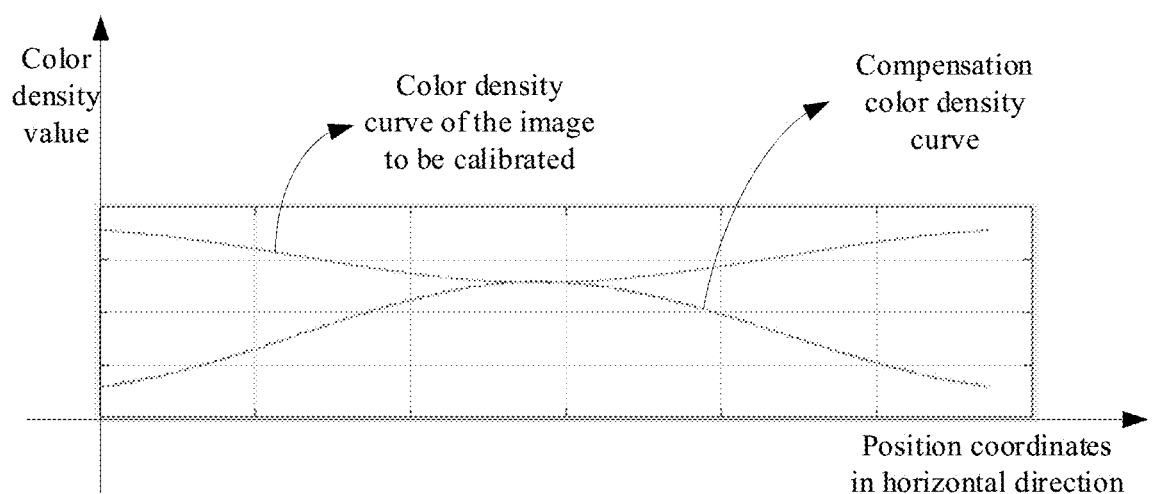
FIG. 5A is a schematic diagram of another color density curve provided by an embodiment of the present disclosure.

FIG. 5A is another schematic diagram of a color density curve provided by an embodiment of the present disclosure. The color density curve of the image to be calibrated and the compensation color density curve are shown in FIG. 5A. The color density curve of the image to be calibrated shown in FIG. 5A corresponds to the color density curve shown in FIG. 2B, and the compensation color density curve shown in FIG. 5A is the color density curve corresponding to the compensation bitmap image.

After the compensation bitmap image corresponding to the compensation color density curve shown in FIG. 5A is blended with the original bitmap image shown in FIG. 2A, an image after uniformity calibration is obtained.

Figure 5B:
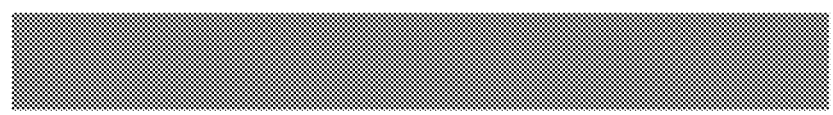
FIG. 5B illustrates an image after uniformity calibration provided by an embodiment of the present disclosure.

FIG. 5B illustrates an image after uniformity calibration provided by an embodiment of the present disclosure. The image after uniformity calibration is an image after uniformity calibration is performed on the image shown in FIG. 2A. As shown in FIG. 5B, the image after uniformity calibration has good uniformity in the darkness/strength/depth of the images in the horizontal direction.

Figure 5C:
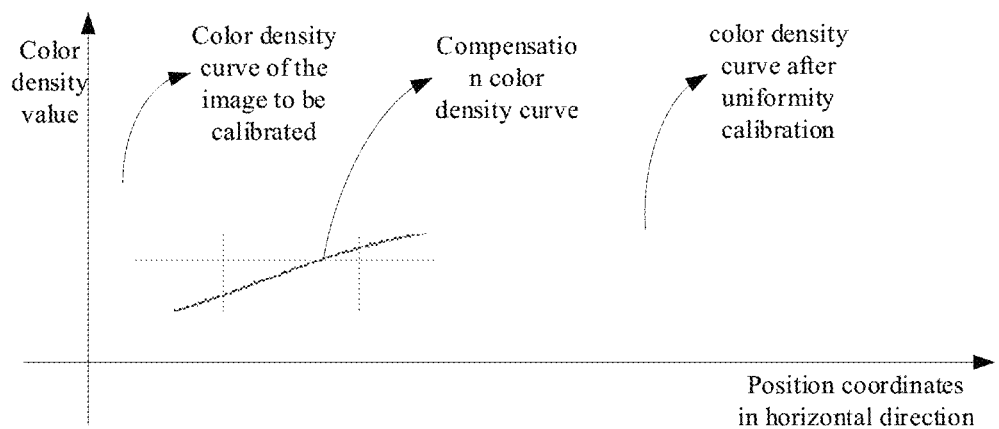
FIG. 5C is a schematic diagram of another color density curve provided by an embodiment of the present disclosure.

FIG. 5C is another schematic diagram of a color density curve provided by an embodiment of the present disclosure. FIG. 5C differs from FIG. 5A in that a color density curve after uniformity calibration is added, and the color density curve after uniformity calibration is the color density curve of the image shown in FIG. 5B, which is used to indicate changing of the color density of the image after uniformity calibration in the horizontal direction. It can be seen from the color density curve after uniformity calibration that the color density values along the horizontal direction has good uniformity. In a possible implementation manner, in order to further improve the accuracy of calibration of the image, after the compensation color density value is obtained, whether uniformity calibration needs to be performed can be further determined according to the compensation color density value.

In an embodiment, before uniformity calibration is performed, the compensation color density value is converted into a corresponding pixel gray value. In an embodiment, the compensation color density value can be converted into a corresponding pixel gray value by searching a table and mapping. Then, the pixel gray value is converted into corresponding raster lattice data. In an embodiment, based on a halftone matrix table of each color channel and by means of a same binary rasterization manner, the pixel gray value is converted into corresponding raster lattice data. Finally, based on a black point distribution characteristic of the raster lattice data, whether uniformity calibration needs to be performed on the image to be calibrated is determined. In this way, it is verified again whether uniformity calibration needs to be performed. The black point distribution characteristic mainly refer to the presentation effect of different toners and different imaging systems on 0/1 dot matrix images. This effect has a certain tolerance. That is, even if there is a difference within a certain range, human eyes are not able to distinguish; however, when beyond this range, the human eyes are able to distinguish, under which condition calibration needs to be performed.

If it is determined in the above manner that uniformity calibration needs to be performed, uniformity calibration is performed on the image to be calibrated. Otherwise, uniformity calibration is performed.

Figure 6A:
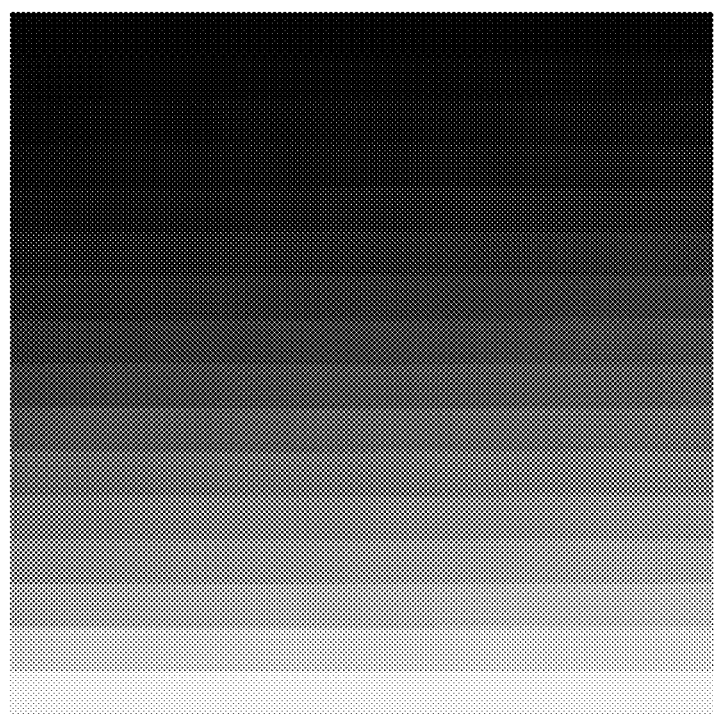
FIG. 6A is a schematic diagram of an image to be calibrated provided by an embodiment of the present disclosure.

FIG. 6A is a schematic diagram of an image to be calibrated provided by an embodiment of the present disclosure. As shown in FIG. 6A, the image to be calibrated has poor uniformity in the width direction of the page. Therefore, uniformity calibration needs to be performed on the image in the width direction of the page.

Figure 6B:
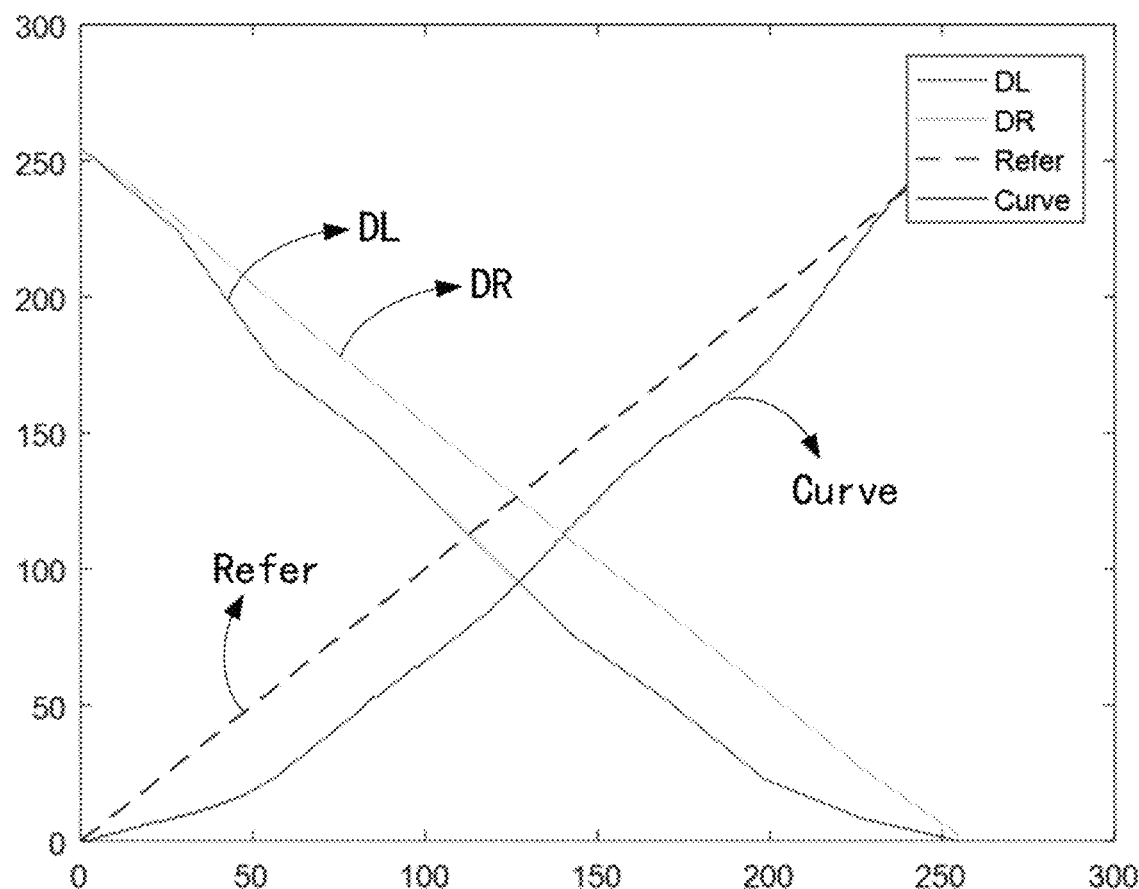
FIG. 6B is a schematic diagram of another color density curve provided by an embodiment of the present disclosure.

FIG. 6B is another schematic diagram of a color density curve provided by an embodiment of the present disclosure. The abscissa represents RGB data corresponding to the calibration reference image, and the ordinate represents a color density value. The curve DL represents a left color density curve obtained based on the calibration reference image. The curve DR represents a right color density curve obtained based on the calibration reference image. The curve "Refer" represents an expected standard color density curve. The curve "Curve" represents a compensation color density curve calculated based on the calibration reference image.

Figure 6C:
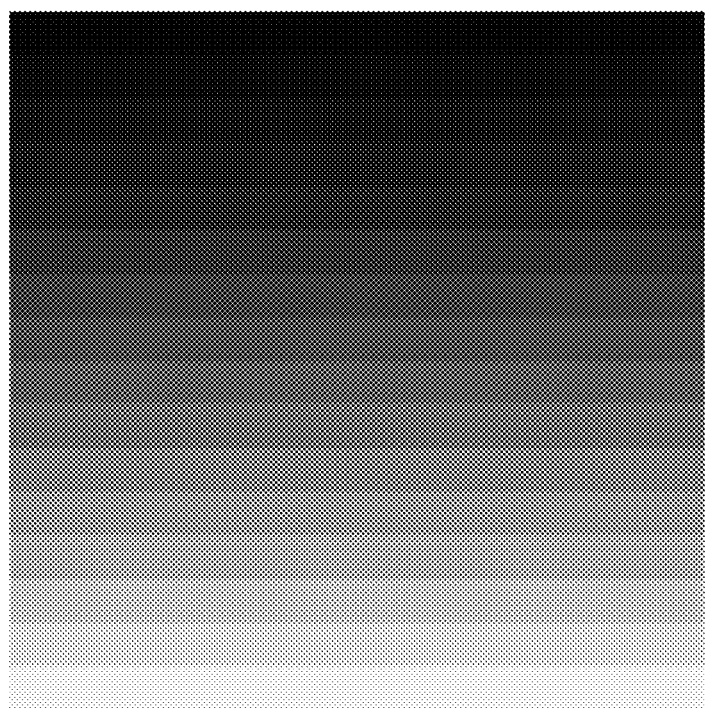
FIG. 6C illustrates a schematic diagram of the image shown in FIG. 6A after uniformity calibration.

FIG. 6C illustrates a schematic diagram of the image shown in FIG. 6A after uniformity calibration. Uniformity calibration can be performed on the image shown in FIG. 6A based on the compensation color density curve shown in FIG. 6B. As shown in FIG. 6C, after uniformity calibration is performed, the uniformity of the depth of the image in the width direction of the page is good.

According to the solution provided by the embodiments of the present disclosure, uniformity calibration can be performed on the image formation device with poor uniformity, such that the image printed by the image formation device has good uniformity. In addition, the calibration scheme provided by the embodiments of the present disclosure can avoid an influence on the printing efficiency due to multiple measurements or calibrations, thereby saving measurement time and cost.

Corresponding to the above method embodiments, an image processing device is further provided by an embodiment of the present disclosure.

Figure 7:
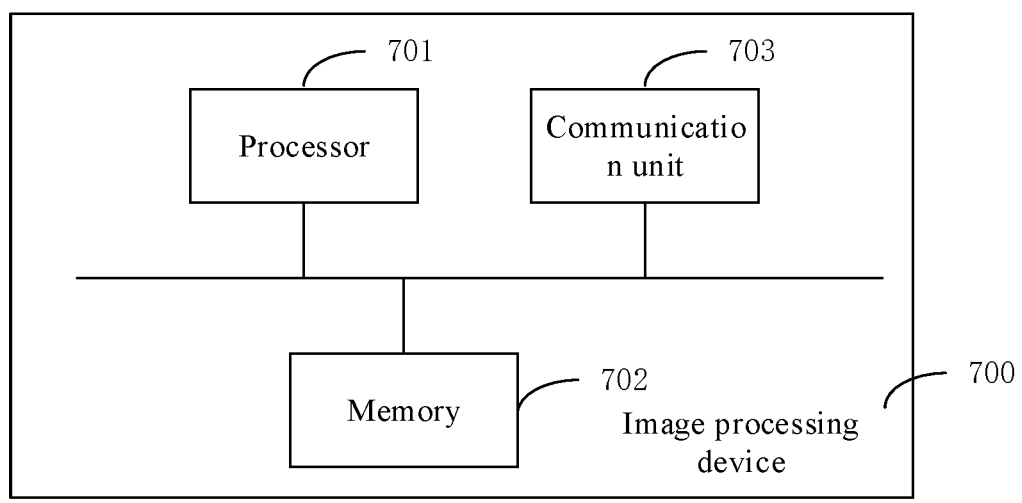
FIG. 7 is a structural schematic diagram of an image processing device provided by an embodiment of the present disclosure.

FIG. 7 is a schematic structural diagram of an image processing device provided by an embodiment of the present disclosure. The image processing device 700 may include: a processor 701, a memory 702, and a communication unit 703. These components communicate through one or more buses. One skilled in the art can understand that a structure of the server shown in the figure does not constitute a limitation on the embodiments of the present invention. It may be a bus-configuration structure or a star-configuration structure. It may include more or fewer components than what is shown, or combine certain components, or arrange different components.

The communication unit 703 is configured to establish a communication channel, such that the storage device can communicate with other devices, receive user data sent by other devices, or send user data to other devices.

The processor 701 is a control center of the storage device, which uses various interfaces and lines to connect various parts of the entire system, and performs various functions of the system and/or process data by running or executing the software programs and/or modules stored in the memory 702 and calling the data stored in the memory. The processor may be composed of an integrated circuit (IC), for example, may be composed of a single packaged IC, or may be composed of a plurality of packaged ICs with a same function or different functions.

The memory 702 is configured to store the execution instructions of the processor 701. The memory 702 can be implemented by any type of volatile or non-volatile storage device or a combination thereof, such as a Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), a magnetic memory, a flash memory, a magnetic disk or a compact disk.

When the execution instructions in the memory 702 are executed by the processor 701, the image processing device 700 is caused to execute some or all of the steps in the above method embodiments on the image processing device.

In an implementation manner, a computer-readable storage medium is further provided by an embodiment of the present disclosure. The computer-readable storage medium may store a program, and when the program is executed, some or all of the steps in the embodiments provided by the present disclosure may be performed. The above-mentioned storage medium may be a magnetic disk, a compact disc, a read-only memory (ROM) or a random access memory (RAM).

In an implementation manner, a computer program product is further provided by an embodiment of the present disclosure. The computer program product includes executable instructions, and when the executable instructions are executed on a computer, the computer is caused to perform some or all of the steps in the above method embodiments.

In the embodiments of the present disclosure, "at least one" refers to one or more, and "a plurality of/multiple" refers to two or more. "And/or", which describes an association relationship of the associated objects, indicates that there are three relationships. For example, "A and/or B" can indicate the existence of "A" alone, the existence of "A and B" at the same time, and the existence of "B" alone. Here, A and B may be singular or plural. The characteristic "/" generally indicates that the associated objects are in an "or" relationship. "At least one of the terms" and similar expressions refer to any combination of these items, including any combination of single or plural items. For example, at least one of a, b or c can represent: a, b, c, a-b, a-c, b-c, or a-b-c. Here, a, b, c may be singular or plural.

One skilled in the art can realize that each unit and algorithm steps described in the embodiments disclosed herein can be implemented by a combination of electronic hardware, computer software and electronic hardware. Whether these functions are performed in hardware or software depends on a specific application and design constraints of the technical scheme. One skilled in the art may implement the described functionality using a different manner for each particular application, but such implementation manner shall not be considered beyond a scope of this application.

One skilled in the art can understand that for convenience and brevity of description, a specific working process of the system, device and unit described above may refer to a corresponding process in the foregoing method embodiments, which will not be repeated herein.

The above description merely illustrates some specific embodiments of the present disclosure. One skilled in the art can easily envisage amendments or substitutions within a technical scope disclosed in the present disclosure, and such amendments or substitutions shall fall into a scope of the present disclosure. The scope of the present disclosure shall be subject to the protection scope claimed by the claims.

What is claimed is:

1. An image calibration method, comprising:
acquiring, by an image formation device with normal calibration and normal uniformity, at least one of a first end color density value or a second end color density value of a calibration reference image along a direction to be calibrated;
calculating a difference between the at least one of the first end color density value or the second end color density value and a target color density value, to obtain at least one of a first end color density difference value or a second end color density difference value, wherein a correct color density value matching the calibration reference image is preset as the target color density value; and
performing uniformity calibration on an image to be calibrated if the at least one of the first end color density difference value or the second end color density difference value is greater than or equal to a preset difference threshold,
wherein said performing uniformity calibration on an image to be calibrated comprises:
calculating, by interpolation fitting, a compensation color density value of an image to be calibrated by taking a reference axis of the image to be calibrated as a standard position, wherein the reference axis is perpendicular to the direction to be calibrated; and
blending an original bitmap image of the image to be calibrated with a compensation bitmap image corresponding to the compensation color density value to obtain a calibrated image,
wherein prior to blending an original bitmap image of the image to be calibrated with a compensation bitmap image corresponding to the compensation color density value to obtain a calibrated image, the image calibration method further comprises:
converting the compensation color density value into a corresponding pixel gray value;
converting the pixel gray value into corresponding raster lattice data; and
determining, based on a black point distribution characteristic of the raster lattice data, whether or not to perform uniformity calibration on the image to be calibrated.

2. The image calibration method according to claim 1, wherein said converting the compensation color density value into a corresponding pixel gray value comprises:
mapping, based on a mapping table, the compensation color density value to a corresponding pixel gray value.

3. The image calibration method according to claim 1, wherein said converting the pixel gray value into corresponding raster lattice data comprises:
converting, based on a halftone matrix table, the pixel gray value into corresponding raster lattice data.

4. The image calibration method according to claim 3, wherein said converting, based on a halftone, the matrix table the pixel gray value into corresponding raster lattice data comprises:
converting, based on a halftone matrix table of each color channel and by means of a same binary rasterization manner, the pixel gray value into corresponding raster lattice data.

5. The image calibration method according to claim 1, wherein the calibration reference image comprises a first color block group and a second color block group, and the first color block group is symmetrical to the second color block group with respect to a reference axis of the calibration reference image, wherein a color block in the first color block group and another block in the second color block group that is symmetrical to the color block in the first color block group have a same pixel value, and wherein the reference axis is perpendicular to the direction to be calibrated.

6. The image calibration method according to claim 5, wherein each of the first color block group and the second color block group comprise two or more color blocks, and the two or more color blocks have different pixel values.

7. The image calibration method according to claim 1, wherein prior to acquiring at least one of a first end color density value or a second end color density value of a calibration reference image along a direction to be calibrated, the image calibration method further comprises:
printing a calibration reference image.

8. The image calibration method according to claim 1, wherein the direction to be calibrated is at least one of a horizontal direction or a vertical direction of a printing page.

9. An image formation device comprising:
a processor; and
a memory,
wherein a computer program is stored in the memory, and when the computer program is executed, the image formation device is caused to execute the image calibration method according to claim 1.

10. A non-transitory computer-readable storage medium which stores a program, wherein when the program is run, a device where the computer-readable storage medium is arranged is controlled to perform the image calibration method according to claim 1.

* * * * *